United States Patent
Sharma et al.

(10) Patent No.: US 11,080,561 B2
(45) Date of Patent: Aug. 3, 2021

(54) TRAINING AND VERIFICATION OF LEARNING MODELS USING HIGH-DEFINITION MAP INFORMATION AND POSITIONING INFORMATION

(71) Applicant: QUALCOMM Incorporated, San Diego, CA (US)

(72) Inventors: Arunandan Sharma, San Diego, CA (US); Sean Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/426,783

(22) Filed: May 30, 2019

(65) Prior Publication Data

US 2020/0380305 A1 Dec. 3, 2020

(51) Int. Cl.
*G06K 9/62* (2006.01)
*G06T 7/70* (2017.01)
*G06T 7/80* (2017.01)
*G06K 9/00* (2006.01)

(52) U.S. Cl.
CPC ....... *G06K 9/6262* (2013.01); *G06K 9/00791* (2013.01); *G06K 9/6202* (2013.01); *G06K 9/627* (2013.01); *G06T 7/70* (2017.01); *G06T 7/80* (2017.01); *G06T 2207/10016* (2013.01); *G06T 2207/20081* (2013.01); *G06T 2207/30252* (2013.01)

(58) Field of Classification Search
USPC ...................................................... 348/148
See application file for complete search history.

(56) References Cited

U.S. PATENT DOCUMENTS

| | | | |
|---|---|---|---|
| 2018/0293466 A1* | 10/2018 | Viswanathan | G05D 1/0246 |
| 2019/0188602 A1* | 6/2019 | Kwant | G06F 16/29 |
| 2019/0258878 A1* | 8/2019 | Koivisto | G05D 1/00 |
| 2019/0259182 A1* | 8/2019 | Sarukkai | G06K 9/627 |
| 2019/0318481 A1* | 10/2019 | Chen | G05D 1/024 |

* cited by examiner

*Primary Examiner* — Christopher S Kelley
*Assistant Examiner* — Ana Picon-Feliciano
(74) *Attorney, Agent, or Firm* — Holland & Hart LLP

(57) ABSTRACT

Methods, systems, and devices for training and verification of learning models are described. A device may capture a camera frame including a road feature of a physical environment, determine a first classification and a first localization of the road feature based on positioning information of the road feature from a high-definition map and positioning information of the device from a positioning engine. The device may analyze a learning model by comparing one or more of the first classification of the road feature or the first localization of the road feature in the camera frame to one or more of a second classification or a second localization of the road feature determined by the learning model. The device may then determine a loss comparison value and adapt the learning model according to the loss comparison value.

20 Claims, 9 Drawing Sheets

TRAINING AND VERIFICATION OF LEARNING MODELS USING HIGH-DEFINITION MAP INFORMATION AND POSITIONING INFORMATION

BACKGROUND

Vehicles may combine various sensors, such as cameras, to detect vehicle surroundings. In an example related to autonomous vehicles, a high-definition map may provide information about road features observed on a road, for example, such as traffic signs, lane markers, and the like. Some techniques use deep learning models for post-processing (e.g., offline) on the information provided by the high-definition maps to provide improvements to autonomous vehicles, such as ensuring lane-level accuracy, or the like. But the techniques necessitate significant amounts of diversified data for training the models, and in some examples, these models may generate inaccurate results. Such inaccuracies may result in poor system performance or failure for driver-assistance systems or autonomous driving applications.

SUMMARY

The described techniques relate to improved methods, systems, devices, and apparatuses that support training and verification of learning models using high-definition map information and positioning information. Generally, the described techniques support improvements in annotation and verification of one or more road features (e.g., traffic signs, lane markers) in a vicinity of a vehicle (e.g., captured by a camera device coupled to the vehicle, detected by one or more sensors associated with a vehicle or other device). Using a combination of captured image frames (e.g., camera frames), high-definition mapping, and precise positioning information, the described techniques may be utilized for training and evaluating deep learning models. Accordingly, the described methods, systems, devices, and apparatuses include training and verification techniques for improving the accuracy of deep learning models applicable to vehicle navigation, for example, to advanced driver-assistance systems (ADAS) or highly autonomous driving (HAD).

Additionally, the described techniques may include, in some examples, determining a first classification and a first localization of a road feature based on positioning information of the road feature from a high-definition map and positioning information of the device from a positioning engine. Additionally or alternatively, the described techniques may include analyzing a learning model by comparing one or more of the first classification or first localization of the road feature in the camera frame to one or more of a second classification or second localization of the road feature determined by the learning model. The described techniques may therefore include features for training and verification of learning models based on high-definition maps and positioning information, among other benefits.

A method at a device is described. The method may include capturing a camera frame including a road feature of a physical environment, determining a first classification of the road feature based on positioning information of the road feature from a high-definition map and positioning information of the device from a positioning engine, determining a first localization of the road feature in the camera frame based on the positioning information of the road feature from the high-definition map and the positioning information of the device from the positioning engine, analyzing a learning model by comparing one or more of the first classification of the road feature or the first localization of the road feature in the camera frame to one or more of a second classification of the road feature determined by the learning model or a second localization of the road feature in the camera frame determined by the learning model, determining a loss comparison value based on the comparing, and adapting the learning model based on the loss comparison value.

An apparatus is described. The apparatus may include a processor, memory in electronic communication with the processor, and instructions stored in the memory. The instructions may be executable by the processor to cause the apparatus to capture a camera frame including a road feature of a physical environment, determine a first classification of the road feature based on positioning information of the road feature from a high-definition map and positioning information of the device from a positioning engine, determine a first localization of the road feature in the camera frame based on the positioning information of the road feature from the high-definition map and the positioning information of the device from the positioning engine, analyze a learning model by comparing one or more of the first classification of the road feature or the first localization of the road feature in the camera frame to one or more of a second classification of the road feature determined by the learning model or a second localization of the road feature in the camera frame determined by the learning model, determine a loss comparison value based on the comparing, and adapt the learning model based on the loss comparison value.

Another apparatus is described. The apparatus may include means for capturing a camera frame including a road feature of a physical environment, determining a first classification of the road feature based on positioning information of the road feature from a high-definition map and positioning information of the device from a positioning engine, determining a first localization of the road feature in the camera frame based on the positioning information of the road feature from the high-definition map and the positioning information of the device from the positioning engine, analyzing a learning model by comparing one or more of the first classification of the road feature or the first localization of the road feature in the camera frame to one or more of a second classification of the road feature determined by the learning model or a second localization of the road feature in the camera frame determined by the learning model, determining a loss comparison value based on the comparing, and adapting the learning model based on the loss comparison value.

A non-transitory computer-readable medium storing code at a device is described. The code may include instructions executable by a processor to capture a camera frame including a road feature of a physical environment, determine a first classification of the road feature based on positioning information of the road feature from a high-definition map and positioning information of the device from a positioning engine, determine a first localization of the road feature in the camera frame based on the positioning information of the road feature from the high-definition map and the positioning information of the device from the positioning engine, analyze a learning model by comparing one or more of the first classification of the road feature or the first localization of the road feature in the camera frame to one or more of a second classification of the road feature determined by the learning model or a second localization of the road feature in the camera frame determined by the learning model, determine a loss comparison value based on the comparing, and adapt the learning model based on the loss comparison value.

In some examples of the method, apparatuses, and non-transitory computer-readable medium described herein, determining the first classification of the road feature further may include operations, features, means, or instructions for determining a first pose of the road feature with respect to the device based on the positioning information of the road feature from the high-definition map and the positioning information of the device from the positioning engine.

Some examples of the method, apparatuses, and non-transitory computer-readable medium described herein may further include operations, features, means, or instructions for determining the second classification of the road feature based on the learning model, where determining the second classification of the road feature includes determining a second pose of the road feature with respect to the device based on the learning model. Some examples of the method, apparatuses, and non-transitory computer-readable medium described herein may further include operations, features, means, or instructions for comparing the first classification of the road feature to the second classification of the road feature determined by the learning model includes comparing the first pose of the road feature to the second pose of the road feature determined by the learning model, where determining the loss comparison value is further based on a difference between the first pose of the road feature and the second pose of the road feature satisfying a threshold.

In some examples of the method, apparatuses, and non-transitory computer-readable medium described herein, determining the first localization of the road feature in the camera frame further may include operations, features, means, or instructions for determining a first multidimensional bounding box for the road feature in the camera frame based on a set of parameters of the device, where the set of parameters includes one or more of a set of intrinsic parameter values or a set of extrinsic parameter values.

Some examples of the method, apparatuses, and non-transitory computer-readable medium described herein may further include operations, features, means, or instructions for determining the second localization of the road feature in the camera frame based on the learning model, where determining the second localization of the road feature includes determining the second localization of the road feature. Some examples of the method, apparatuses, and non-transitory computer-readable medium described herein may further include operations, features, means, or instructions for comparing the first localization of the road feature in the camera frame to the second localization of the road feature in the camera frame determined by the learning model includes comparing the first multidimensional bounding box to the second multidimensional bounding box determined by the learning model, where determining the loss comparison value is further based on a difference between the first multidimensional bounding box and the second multidimensional bounding box satisfying a threshold.

Some examples of the method, apparatuses, and non-transitory computer-readable medium described herein may further include operations, features, means, or instructions for comparing one or more pixel values associated with one or more coordinates of the first multidimensional bounding box to one or more pixel values associated with one or more coordinates of the second multidimensional bounding box, where determining the loss comparison value may be further based on a difference between the one or more pixel values of the first multidimensional bounding box and the one or more pixel values of the second multidimensional bounding box.

In some examples of the method, apparatuses, and non-transitory computer-readable medium described herein, the set of intrinsic parameter values includes one or more of a focal length associated with the device, a principal point associated with the device, a skew coefficient associated with the device, or a distortion associated with the device, and the set of extrinsic parameter values includes one or more of a rotation associated with a reference frame for the device or a translation associated with the reference frame for the device.

Some examples of the method, apparatuses, and non-transitory computer-readable medium described herein may further include operations, features, means, or instructions for triggering on-demand calibration of the device based on the loss comparison value satisfying a threshold, and calibrating, based on the triggering, the device using the set of parameters, where determining the first multidimensional bounding box for the road feature in the camera frame may be further based on the calibrating.

Some examples of the method, apparatuses, and non-transitory computer-readable medium described herein may further include operations, features, means, or instructions for annotating the camera frame with road feature information based on adapting the learning model.

Some examples of the method, apparatuses, and non-transitory computer-readable medium described herein may further include operations, features, means, or instructions for capturing one or more camera frames including the road feature of the physical environment based on the loss comparison value satisfying a threshold, and transmitting the one or more camera frames to verify the annotating using the one or more subsequent camera frames.

Some examples of the method, apparatuses, and non-transitory computer-readable medium described herein may further include operations, features, means, or instructions for determining a confidence value of the learning model based on the loss comparison value, where adapting the learning model may be further based on the confidence value.

Some examples of the method, apparatuses, and non-transitory computer-readable medium described herein may further include operations, features, means, or instructions for receiving loss comparison value feedback, where adapting the learning model based on the loss comparison value feedback.

In some examples of the method, apparatuses, and non-transitory computer-readable medium described herein, the first classification of the road feature includes one or more of a first geometric shape of the road feature with respect to the device, a first dimension of the road feature with respect to the device, or a first visual attribute of the road feature with respect to the device, and the second classification of the road feature includes one or more of a second geometric shape of the road feature with respect to the device, a second dimension of the road feature with respect to the device, or a second visual attribute of the road feature with respect to the device.

Some examples of the method, apparatuses, and non-transitory computer-readable medium described herein may further include operations, features, means, or instructions for determining one or more of a first geometric shape of the road feature, a first dimension of the road feature, or a first visual attribute of the road feature based on the positioning information of the road feature from the high-definition map and the positioning information of the device from the positioning engine.

Some examples of the method, apparatuses, and non-transitory computer-readable medium described herein may further include operations, features, means, or instructions for determining the second classification of the road feature based on the learning model, where determining the second classification of the road feature includes determining one or more of a second geometric shape of the road feature, a second dimension of the road feature, or a second visual attribute of the road feature based on the learning model. Some examples of the method, apparatuses, and non-transitory computer-readable medium described herein may further include operations, features, means, or instructions for comparing the first classification of the road feature to the second classification of the road feature determined by the learning model includes comparing one or more of the first geometric shape of the road feature, the first dimension of the road feature, or the first visual attribute of the road feature to one or more of the second geometric shape of the road feature determined by the learning model, the second dimension of the road feature determined by the learning model, or the second visual attribute of the road feature determined by the learning model. In some examples, determining the loss comparison value may be further based on a difference between one or more of the first geometric shape of the road feature, the first dimension of the road feature, or the first visual attribute of the road feature and one or more of the second geometric shape of the road feature, the second dimension of the road feature, or the second visual attribute of the road feature satisfying a threshold.

DETAILED DESCRIPTION

The described techniques relate to improved methods, systems, devices, and apparatuses that support improvements in training and verifying learning models, for example, deep learning models capable of clustering and classifying information for object or pattern recognition. In some examples, the techniques described herein support improvements in annotation and verification of multiple road features (e.g., traffic signs or lane markers), for example, in proximity to a vehicle (e.g., captured by a camera of the vehicle or other technique) using precise positioning and high-definition mapping. The described techniques may support determining a classification of a road feature (e.g., a pose of a road feature relative to a vehicle, a pose of a road feature captured by a camera of the vehicle) using high-definition map feature information, determining coordinate information (e.g., corners, centers) of the road feature, and/or determining precise positioning information of the vehicle (e.g., global or local pose of the vehicle) using a positioning engine (e.g., very precise positioning engine (VPPE)). A pose may be, for example, an orientation, an angular position, a locality, or coordinates of an object or a portion of the object relative to another object (e.g., of a road feature relative to a vehicle or a camera of the vehicle). Using a combination of captured image frames (e.g., camera frames), high-definition map information and precise positioning information, the described techniques may be used to train and evaluate learning models.

Particular aspects of the subject matter described herein may be implemented to realize one or more advantages. The described techniques may support improvements in training and verification of learning models, among other advantages. As such, supported techniques may include features for providing accurate models applicable to vehicle navigation systems. The described techniques may also support improved reliability for training and verification of learning models as the improvements may provide for continuous refinement in learning model accuracy for road feature prediction and identification beneficial to vehicle navigation systems.

Aspects of the disclosure are initially described in the context of a system. Aspects of the disclosure are further illustrated by and described with reference to verification of road features using high-definition map data and positioning information from a positioning engine. Aspects of the disclosure are further illustrated by and described with reference to apparatus diagrams, system diagrams, and flowcharts that relate to training and verifying deep learning models.

Figure 1:
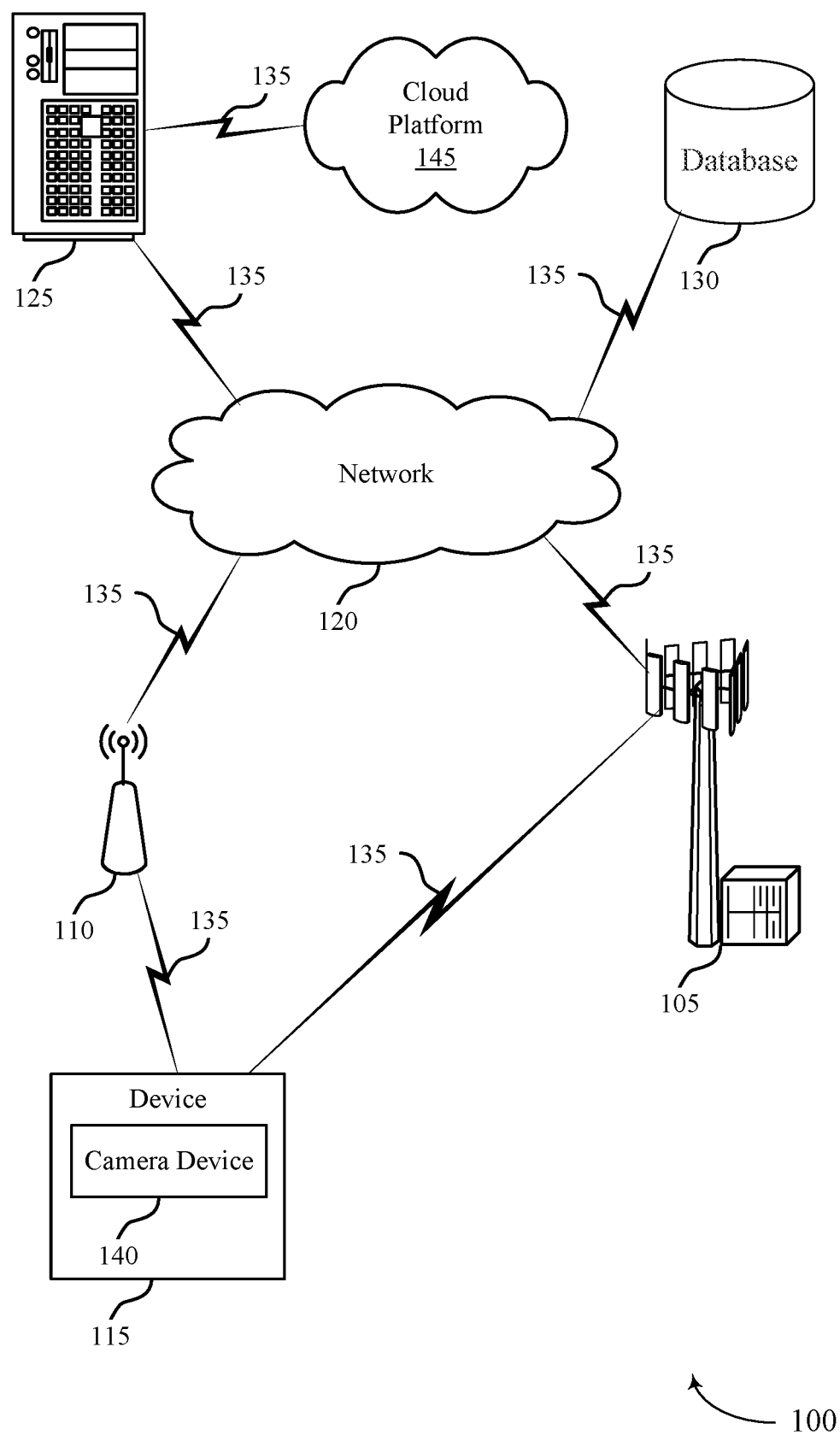
FIG. 1 illustrates an example of a system for learning models that supports training and verification of learning models using high-definition map information and positioning information in accordance with aspects of the present disclosure.

FIG. 1 illustrates an example of a system 100 for learning models that supports training and verification of learning models using high-definition map information and positioning information in accordance with aspects of the present disclosure. The system 100 may include a base station 105, an access point 110, a device 115, a server 125, a database 130, and a cloud platform 145. The base station 105, the access point 110, the device 115, the server 125, and the database 130 may communicate with each other via network 120 using communications links 135. In some examples, the system 100 may support improved training and verification of learning models, thereby providing enhancements to vehicle navigation systems.

The base station 105 may wirelessly communicate with the device 115 via one or more base station antennas. Base station 105 described herein may include or may be referred to by those skilled in the art as a base transceiver station, a radio base station, a radio transceiver, a NodeB, an eNodeB (eNB), a next-generation Node B or giga-nodeB (either of which may be referred to as a gNB), a Home NodeB, a Home eNodeB, or some other suitable terminology. The device 115 described herein may be able to communicate with various types of base stations and network equipment including macro eNBs, small cell eNBs, gNBs, relay base stations, and the like. The access point 110 may be configured to provide wireless communications for the device 115 over a relatively smaller area compared to the base station 105.

The device 115 may include a camera device 140. The camera device 140 may be a standalone camera, a digital camera, a stereo camera, and/or the like that may be integrated with the device 115. In some examples, the device 115 may support multiple cameras. The camera device 140 may have one or more sensors for example, such as a charge coupled device (CCD) sensor or a complementary metal-oxide semiconductor (CMOS) sensor. In some examples, the camera device 140 may capture a set of images of a physical environment (e.g., a multi-dimensional space) having a number of road features disposed within the environment. A bounding box in an image may define a multi-dimensional target, such as a road feature, which may be used by the device 115 for training and verifying learning models. The techniques described herein for training and verification of learning models using high-definition maps and precise positioning information may support autonomous or semi-autonomous functions related to, for example, advanced driver-assistance systems (ADAS) or highly autonomous driving (HAD). Thereby, a position of the multi-dimensional target (e.g., road feature) proximate to the device 115 may be established with a high degree of accuracy in the physical (local) environment.

In some examples, the device 115 may be stationary and/or mobile. In some examples, the device 115 may include an automotive vehicle, an aerial vehicle, such as an unmanned aerial vehicle (UAV), ground vehicles and robots (e.g., autonomous or semi-autonomous cars, vacuum robots, search and rescue robots, bomb detection and disarming robots), water-based vehicles (i.e., surface watercraft and submarines); space-based vehicles (e.g., a spacecraft or space probe), and/or some combination thereof. Various embodiments may be particularly useful for the device 115 configured as part of a computer vision-based driving assistance system, advanced driver-assistance systems (ADAS), highly autonomous driving (HAD), etc.

The device 115 may, additionally or alternatively, include or be referred to by those skilled in the art as a user equipment (UE), a user device, a cellular phone, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the device 115 may also be able to communicate directly with another device (e.g., using a peer-to-peer (P2P) or device-to-device (D2D) protocol).

The device 115 may include memory, a processor, an output, and a communication module. The processor may be a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), and/or the like. The processor may be configured to process data (e.g., images, bounding boxes, loss comparison values, calibration information, intrinsic parameter values, extrinsic parameter values,) from and/or write data (e.g., images, bounding boxes, loss comparison values, calibration information, intrinsic parameter values, extrinsic parameter values) to the memory. The processor may also be configured to provide image enhancements, image restoration, image analysis, image compression, and image synthesis. For example, the device 115 may support annotation and verification of multiple road features, training and verification of learning models, and camera calibration, according to the techniques described herein.

The memory may be, for example, a random-access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some examples, the device 115 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, annotation and verification of multiple road features, training and verification of learning models.

The network 120 that may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G) for example), etc. Network 120 may include the Internet.

The server 125 may include any combination of a data server, a cloud server, a server associated with an automation service provider, proxy server, mail server, web server, application server, a map server, a road assistance server, database server, communications server, home server, mobile server, or any combination thereof. The server 125 may also transmit to the device 115 a variety of information, such as instructions or commands relevant to annotation and verification of multiple road features and training and verifying learning models. The database 130 may store data that may include instructions or commands (e.g., images, high-definition map information, intrinsic parameter values, extrinsic parameter values,) relevant to positioning information and coordinate information associated with a road features. The device 115 may retrieve the stored data from the database 130 via the base station 105 and/or the access point 110. The cloud platform 145 may be an example of a public or private cloud network. The device 115 may also be referred to here as a cloud client, which may access the cloud platform 145 over the network 120. In some examples, a cloud client may access the cloud platform 145 to store, manage, and process data associated with a learning model.

The communications links 135 shown in the system 100 may include uplink transmissions from the device 115 to the base station 105, the access point 110, or the server 125, and/or downlink transmissions, from the base station 105, the access point 110, the server 125, and/or the database 130 to the device 115. The downlink transmissions may also be called forward link transmissions while the uplink transmissions may also be called reverse link transmissions. The communications links 135 may transmit bidirectional communications and/or unidirectional communications. Communications links 135 may include one or more connections, including but not limited to, 345 MHz, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

Figure 2:
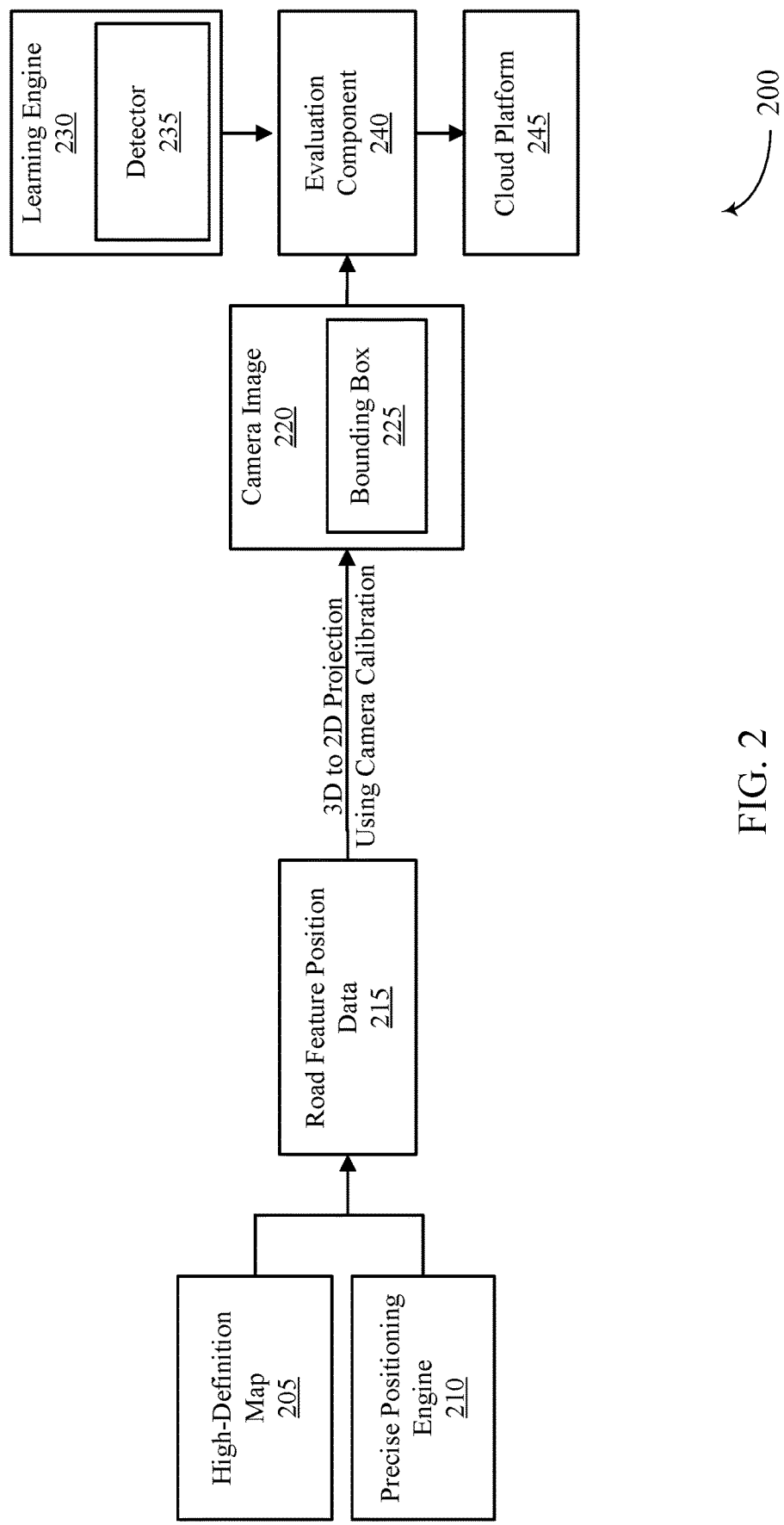
FIG. 2 illustrates an example of a training and verification scheme that supports training and verification of learning models using high-definition map information and positioning information in accordance with aspects of the present disclosure.

FIG. 2 illustrates an example of a training and verification scheme 200 that supports training and verification of learning models using high-definition map information and positioning information in accordance with aspects of the present disclosure. The training and verification scheme 200 may implement aspects of the system 100 for example, such as providing improvements in training and verifying deep learning models. For example, a device 115 may support the training and verification scheme 200 for training and verifying deep learning models. The training and verification scheme 200 may include a high-definition map 205, a precise positioning engine 210, road feature position data 215, camera image 220, a learning engine 230, an evaluation component 240, and a cloud platform 245, aspects of which are described herein. The training and verification scheme 200 may therefore support improved training and verification of learning models, and, in some examples, may promote enhancements to vehicle navigation systems.

The high-definition map 205 may determine positioning information about multiple road features located along a road, such as traffic signs, lane markers, etc. In some examples, the high-definition map 205 may be, for example, a global traffic sign pose map, which may provide detailed positioning information about road features that can be in a map frame or a global frame. In an example case of a traffic sign, the high-definition map 205 may include positioning information, such as an absolute location of the traffic sign, coordinates of the traffic sign, a shape of the traffic sign, a type of traffic sign (e.g., a speed limit sign, an exit sign), content of the traffic sign (e.g., speed limit, exit number), or a combination thereof.

With reference to FIG. 1, the device 115 may use the high-definition map 205 as a ground truth (e.g., baseline) in verifying global or local position values (e.g., coordinates) provided by the precise positioning engine 210. For example, the device 115 may use the high-definition map 205 as a baseline for verifying positioning information provided by the precise positioning engine 210 (e.g., global or local position values) with respect to locations where maps have been observed to be stagnant (e.g., not changing over a period of time). In some examples, the device 115 may determine a classification of a road feature based on positioning information of the device 115 from a high-definition map, such as the high-definition map 205.

The precise positioning engine 210 may determine positioning information related to the device 115 or camera device 140. In some examples, the precise positioning engine 210 may be a very precise positioning engine (VPPE) capable of providing or ensuring lane-level accuracy. In an example, the precise positioning engine 210 may be a VPPE capable of providing decimeter accuracy, for example with up to six degrees of freedom (6-DOF), as well as capable of providing a global ego pose.

In some examples, the precise positioning engine 210 may be part of a driver response (DR) system including global positioning signal (GPS) measurements and inertial measurement units (IMU). The precise positioning engine 210 may, in some examples, include a fusion of GPS, IMU, and camera sensor data (e.g., camera sensor data provided by, for example, the camera device 140 as described in FIG. 1) to determine global or local positioning information of the device 115 or the camera device 140. The device 115 may be a vehicle equipped with the camera device 140, which may be a camera capable of determining ego-motion (e.g., 3D movement). In some examples, the device 115 may determine a classification of the road feature based on positioning information of the road feature from the high-definition map 205 and positioning information of the device 115 from the precise positioning engine 210.

The device 115 may determine a classification of a road feature for multiple purposes, for example, for autonomous or semi-autonomous driving applications. In some examples, the device 115 may be a vehicle (e.g., an ego-motion vehicle) equipped with the camera device 140 (e.g., one or more camera sensors facing in forward, rear, and/or lateral directions). The device 115 may determine and provide road feature position data 215 based on information provided (determined) by the high-definition map 205 and information provided (determined) by the precise positioning engine 210 (e.g., global or local position information of a vehicle). The road feature position data 215 may include, for example, classification of one or more road features. In determining road feature position data 215, the device 115 may determine a pose of a road feature relative to the device 115 or the camera device 140. In an example, the road feature position data 215 may include relative pose of a road feature (e.g., traffic sign) with real-time ego-motion.

In some examples, the device 115 or the camera device 140 may determine a first localization of a road feature in a camera frame based on positioning information of the road feature from the high-definition map 205 and positioning information of the device 115 from precise positioning engine 210. Additionally, the device 115 may determine a first localization of a road feature based on a set of parameters of the camera device 140. The parameters may be, for example, intrinsic or extrinsic parameter values of the camera device 140.

In an example, in determining the first localization of a road feature, the device 115 may annotate road features and lane marker data. For example, in determining the first localization, the device 115 may determine a bounding box for a road feature in a camera frame based on positioning information of the road feature provided by the high-definition map 205 and a positioning information of the device 115 or the camera device 140 as provided by the precise positioning engine 210 to obtain the road feature position data 215 for a road feature proximate to the device 115 (e.g., pose of a road feature such as a traffic sign, relative to the device 115 or to one or more camera sensors equipped to the device 115). The bounding box for a road feature in a camera frame may include points displayed in the camera frame which correspond to the positioning information of the road feature relative to the positioning information of the device 115 or the camera device 140, as provided by the high-definition map 205 and the precise positioning engine 210. For example, the bounding box may be displayed in the camera frame as a visual indicator of the presence or shape of a road feature relative to the device 115 or the camera device 140. The bounding box may implement (e.g., generated or visualized) according to any shape. For example, the bounding box may be an indicator having a square shape, rectangular shape, or circular shape, or any shape variation. Additionally or alternatively, the bounding box may be or may be combined with a graphical icon displayed in the camera frame as an indicator of the road feature (e.g., an icon indicative of a traffic sign or a lane marker). In an example, the device 115 may be a vehicle and a vehicle frame of origin may correspond to the location of the camera device 140 (e.g., camera sensor location).

Additionally or alternatively, the device 115 may determine a first classification of a road feature (e.g., pose of the road feature with respect to the device 115) based on real-time location of the camera device 140. In an example, the device 115 may adjust (e.g., transform) a frame of origin from the origin of the device 115 to the origin of the camera device 140 (e.g., ego-vehicle origin to camera location). For example, the device 115 or the camera device 140 may translate the real-time location of the device 115 to a real-time location of the camera device 140, and determine the first classification of a road feature (e.g., a pose of the road feature with respect to the device 115) based on the translated real-time location of the camera device 140.

In some examples, the device 115 may use road feature position data 215 to determine (e.g., obtain) a bounding box 225, and may display the bounding box 225 in combination with a camera image 220 captured by the camera device 140 (e.g., one or more camera devices or camera sensors) equipped to the device 115. For example, the device 115 or camera device 140 may determine and display one or more bounding boxes 225 on the camera image 220 to indicate the presence and one or more characteristics of one or more road features within a determined distance from the device 115. In an example, the bounding box 225 displayed on the camera image 220 may indicate or highlight a road feature present (e.g., visible) in the camera image 220. Additionally or alternatively, in some examples, the bounding box 225 may indicate or highlight a road feature which may not be present (e.g., hidden from view) in the camera image 220.

For example, using the high-definition map 205 as a baseline in combination with the data provided by the precise positioning engine 210 (e.g., real-time global or local position information), the device 115 may identify road features hidden from view of a driver or the camera device 140 due to, for example, the presence of an object obstructing the view, inclement weather conditions, etc. and display the bounding box 225 corresponding to the hidden road features. In an example, the bounding box 225 may include pixel values associated with coordinates of the bounding box 225 (e.g., a center or corners of the bounding box 225). As such, the bounding box 225 may be a multi-dimensional bounding box. In some examples, generating the camera image 220 may be inclusive of one or more bounding boxes 225 and may include performing a 3D to 2D projection using camera calibration. Alternatively or additionally, the device 115 or camera device 140 may generate and display an image and determine the bounding box 225 corresponding to a road feature with respect to a 3D space.

The device 115 may annotate the camera image 220 with road feature information (e.g., traffic sign information), and further, train a learning model (e.g., neural network model, convolutional neural network model, a machine learning model, reinforcement learning models) for road feature detection (e.g., traffic sign or lane marker detection). In some examples, the device 115 may train the learning model offline after raw data has been collected. For example, the device 115 may forward information to training the learning model on the cloud platform 245 with reference to FIG. 1.

In some examples, an autonomy stack may handle a map as a sensor and use the map information for high-level localization. The autonomy stack may combine the high-definition map 205, the precise positioning engine 210, and perception data to perform map-fusion. The techniques proposed herein may include modifying (e.g., flipping) the autonomy stack approach to perform verification of perception models (e.g., verification of predictions output by a learning model). In an example, the techniques may be triggered on the basis of pre-existing knowledge provided by the high-definition map 205 (e.g., known map locations of traffic signs).

In some examples, the device 115 may analyze a learning model of the learning engine 230 by comparing one or more of a first classification of a road feature or a first localization of the road feature in a camera frame to one or more of a second classification of the road feature or a second localization of the road feature in the camera frame determined by the learning model. In analyzing the learning model, the device 115 may verify output provided by the learning model of the learning engine 230. For example, the device 115 may determine a first classification or a first localization of a road feature as described above, and the learning model may determine a second classification or a second localization of the same road feature.

In an example, the device 115 may generate a first classification of a road feature (e.g., size of the road feature, type of the road feature, pose of the road feature with respect to device 115 or camera device 140) or a first localization for a road feature in a camera frame (e.g., bounding box for the road feature in the camera frame) based on positioning information of the road feature from the high-definition map 205 and positioning information of the device 115 from the precise positioning engine 210, as described above. The learning model of the learning engine 230 may generate a second classification of the road feature or a second localization for the road feature in a camera frame, based on, for example, positioning information, classifications, and localizations of road features previously determined by the device 115. The learning engine 230 may incorporate a detector 235 which may detect pixel locations of traffic signs from a camera image.

The first and second classifications may each include a pose of a road feature with respect to the device 115 or the camera device 140, and in analyzing the learning model, the device 115 or the camera device 140 may compare the pose included in the first classification to the pose included in the second classification. Alternatively or additionally, the first and second classifications may each include a size, a type, or a content of the road feature, and in analyzing the learning model, the device 115 or the camera device 140 may compare a size, a type, or content included in the first classification to a size, a type, or content included in the second classification. In an example of a traffic sign, the classification may include speed limit sign, exit sign, and the like.

The first and second localizations may each include a bounding box 225 indicating the presence or characteristics of a road feature, and in analyzing the learning model, the device 115 may compare the bounding box 225 of the first localization to the bounding box 225 of the second localization. In some examples, the device 115 may compare one or more pixel values associated with one or more coordinates of the first bounding box with one or more pixel values associated with one or more coordinates of the second bounding box. For example, the device 115 may use the evaluation component 240 that may have a comparator function that may evaluate the first and second bounding boxes for differences in value between the pixel values associated with coordinates of the first bounding box and the pixel values associated with coordinates of the second bounding box. If the difference between the pixel values is greater than a threshold, the evaluation component 240 may generate a loss comparison value indicating the amount of difference.

The device 115 may apply the loss comparison value toward training and verification of the learning model. For example, the device 115 may quantify a quality of a learning model output for traffic signs through information indicating confidence level. For example, the device 115 may quantify the quality of the learning model used by the learning engine 230 in terms of reliability and accuracy. Further, the information indicating confidence level may be consumed by functions downstream. For example, functions downstream may use the information as functional safety verification of the output of learning engine 230.

In some examples, the device 115 may trigger the capture of raw images based on a loss comparison value, and further forward the raw images to a cloud platform (e.g., the cloud platform 245 in FIG. 1) for further annotation and for improving a learning model. In some other examples, the device 115 may forward a loss comparison value to a cloud platform (e.g., the cloud platform 245 in FIG. 1) for tracking the loss comparison value with respect to one or more variables. For example, the device 115 or a cloud platform may track loss comparison values spanning different periods of time (e.g., various numbers of days), for different weather conditions, for different traffic lanes, and even for different vehicles on which a learning model (e.g., a deep learning perception model) is deployed. In other examples, a cloud platform may identify accuracy of a loss function based on the tracked loss comparison values and associated variables, and relay such information back to the device 115.

Therefore, the device 115 may use training and verification scheme 200 to, for example, classify errors according to a type (e.g., classify errors as errors in size or type with respect to road features), identify and correct false positives (e.g., a case where the high-definition map 205 indicates that a road feature is a stop sign, but a learning model of the learning engine 230 incorrectly indicates that the road feature is a yield sign), and identify and correct misdetection of road features (e.g., a case where the high-definition map 205 indicates the presence of a road feature, but a learning model of the learning engine 230 fails to indicate the presence of the road feature).

Figure 3:
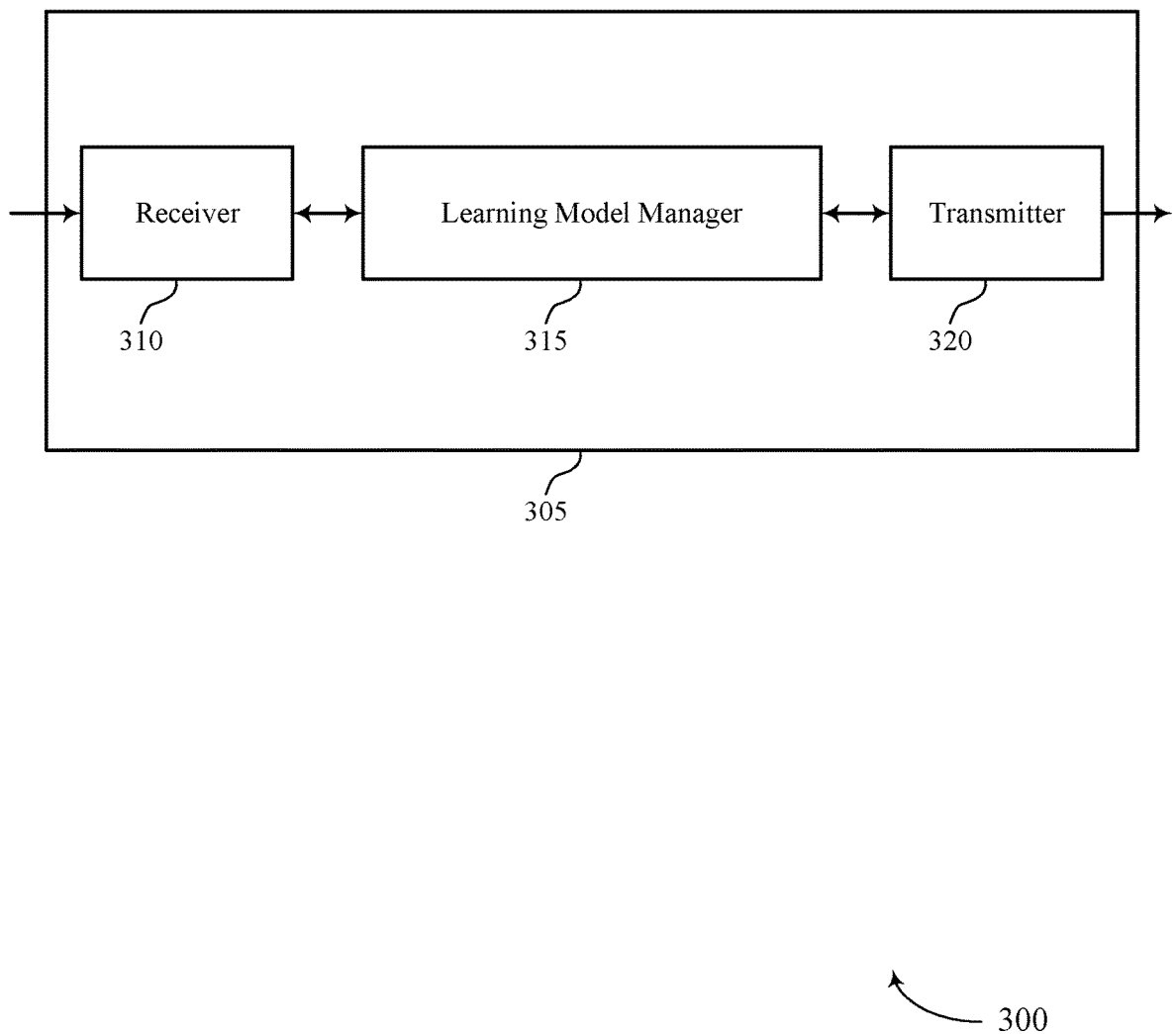
FIGS. 3 and 4 show block diagrams of devices that support training and verification of learning models using high-definition map information and positioning information in accordance with aspects of the present disclosure.

FIG. 3 shows a block diagram 300 of a device 305 that supports training and verification of learning models using high-definition map information and positioning information in accordance with aspects of the present disclosure. The device 305 may be an example of aspects of a device as described herein. The device 305 may include a receiver 310, a learning model manager 315, and a transmitter 320. The device 305 may also include a processor. Each of these components may be in communication with one another (e.g., via one or more buses).

The receiver 310 may receive information such as packets, user data, or control information associated with various information channels (e.g., control channels, data channels, and information related to training and verification of learning models using high-definition map information and positioning information). Information may be passed on to other components of the device 305. The receiver 310 may be an example of aspects of the transceiver 620 described with reference to FIG. 6. The receiver 310 may utilize a single antenna or a set of antennas.

The learning model manager 315 may capture a camera frame including a road feature of a physical environment, determine a first classification of the road feature based on positioning information of the road feature from a high-definition map and positioning information of the device from a positioning engine, determine a first localization of the road feature in the camera frame based on the positioning information of the road feature from the high-definition map and the positioning information of the device from the positioning engine, analyze a learning model by comparing one or more of the first classification of the road feature or the first localization of the road feature in the camera frame to one or more of a second classification of the road feature determined by the learning model or a second localization of the road feature in the camera frame determined by the learning model, determine a loss comparison value based on the comparing, and adapt the learning model based on the loss comparison value. The learning model manager 315 may be an example of aspects of the learning model manager 610 described herein.

The learning model manager 315, or its sub-components, may be implemented in hardware, code (e.g., software or firmware) executed by a processor, or any combination thereof. If implemented in code executed by a processor, the functions of the learning model manager 315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The learning model manager 315, or its sub-components, may be physically located at various positions, including being distributed such that portions of functions are implemented at different physical locations by one or more physical components. In some examples, the learning model manager 315, or its sub-components, may be a separate and distinct component in accordance with various aspects of the present disclosure. In some examples, the learning model manager 315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 320 may transmit signals generated by other components of the device 305. In some examples, the transmitter 320 may be collocated with a receiver 310 in a transceiver module. For example, the transmitter 320 may be an example of aspects of the transceiver 620 described with reference to FIG. 6. The transmitter 320 may utilize a single antenna or a set of antennas.

Figure 4:
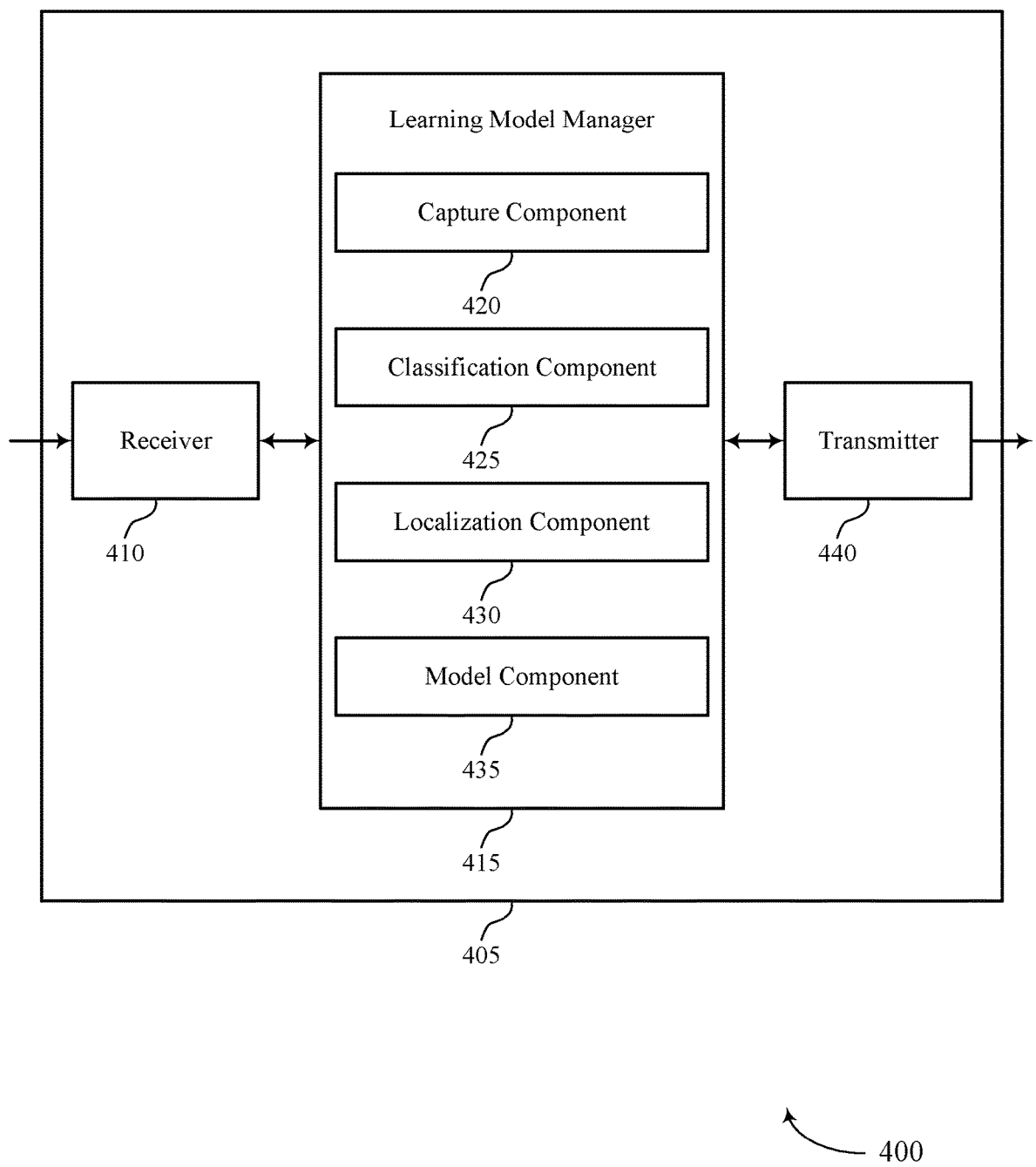

FIG. 4 shows a block diagram 400 of a device 405 that supports training and verification of learning models using high-definition map information and positioning information in accordance with aspects of the present disclosure. The device 405 may be an example of aspects of a device 305 or a device 115 as described herein. The device 405 may include a receiver 410, a learning model manager 415, and a transmitter 440. The device 405 may also include a processor. Each of these components may be in communication with one another (e.g., via one or more buses).

The receiver 410 may receive information such as packets, user data, or control information associated with various information channels (e.g., control channels, data channels, and information related to training and verification of learning models using high-definition map information and positioning information). Information may be passed on to other components of the device 405. The receiver 410 may be an example of aspects of the transceiver 620 described with reference to FIG. 6. The receiver 410 may utilize a single antenna or a set of antennas.

The learning model manager 415 may be an example of aspects of the learning model manager 315 as described herein. The learning model manager 415 may include a capture component 420, a classification component 425, a localization component 430, and a model component 435. The learning model manager 415 may be an example of aspects of the learning model manager 610 described herein. The capture component 420 may capture a camera frame including a road feature of a physical environment. The classification component 425 may determine a first classification of the road feature based on positioning information of the road feature from a high-definition map and positioning information of the device from a positioning engine. The localization component 430 may determine a first localization of the road feature in the camera frame based on the positioning information of the road feature from the high-definition map and the positioning information of the device from the positioning engine. The model component 435 may analyze a learning model by comparing one or more of the first classification of the road feature or the first localization of the road feature in the camera frame to one or more of a second classification of the road feature determined by the learning model or a second localization of the road feature in the camera frame determined by the learning model, determine a loss comparison value based on the comparing, and adapt the learning model based on the loss comparison value.

The transmitter 440 may transmit signals generated by other components of the device 405. In some examples, the transmitter 440 may be collocated with a receiver 410 in a transceiver module. For example, the transmitter 440 may be an example of aspects of the transceiver 620 described with reference to FIG. 6. The transmitter 440 may utilize a single antenna or a set of antennas.

Figure 5:
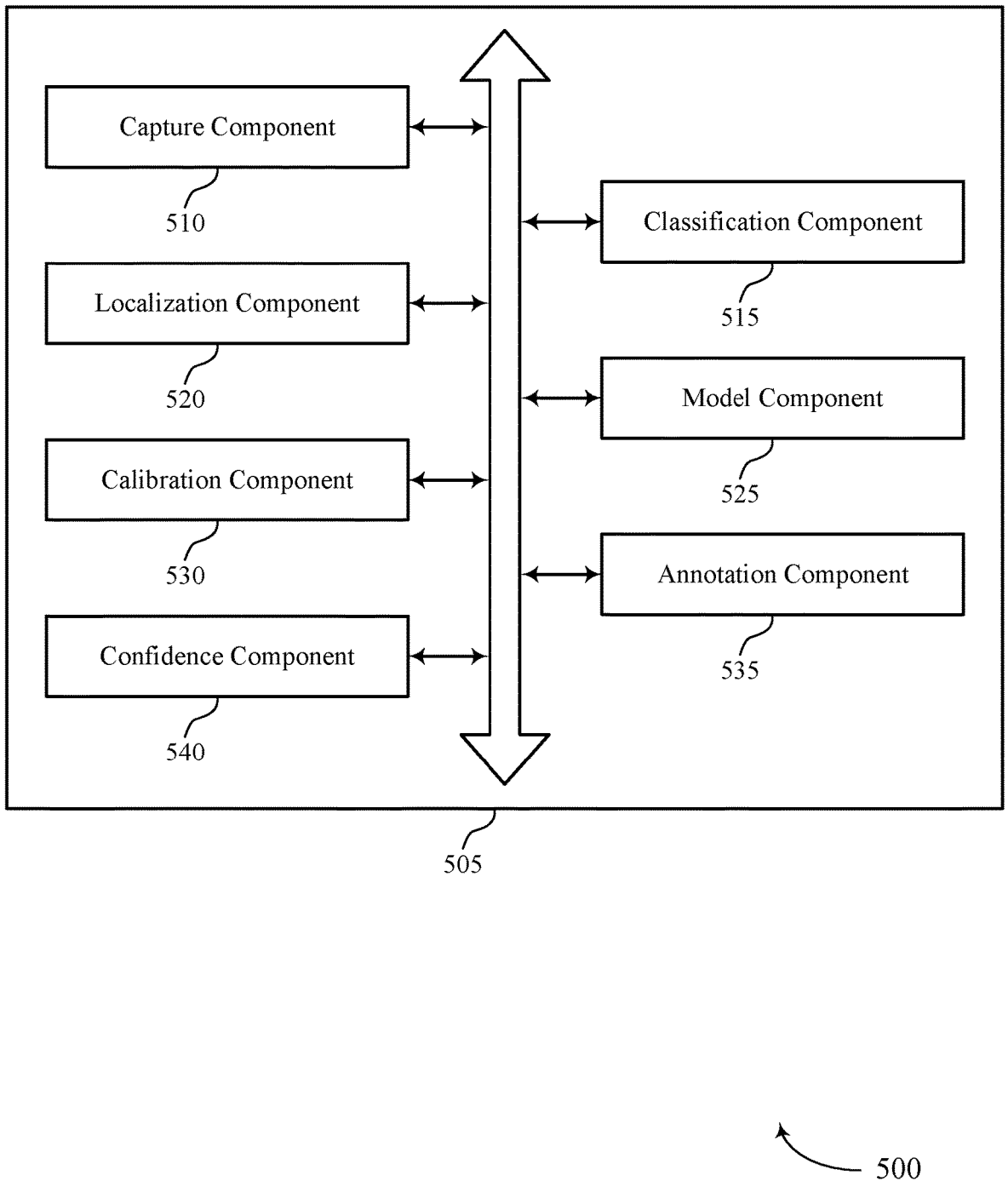
FIG. 5 shows a block diagram of a learning model manager that supports training and verification of learning models using high-definition map information and positioning information in accordance with aspects of the present disclosure.

FIG. 5 shows a block diagram 500 of a learning model manager 505 that supports training and verification of learning models using high-definition map information and positioning information in accordance with aspects of the present disclosure. The learning model manager 505 may be an example of aspects of a learning model manager 315, a learning model manager 415, or a learning model manager 610 described herein. The learning model manager 505 may include a capture component 510, a classification component 515, a localization component 520, a model component 525, a calibration component 530, an annotation component 535, and a confidence component 540. Each of these modules may communicate, directly or indirectly, with one another (e.g., via one or more buses).

The capture component 510 may capture a camera frame including a road feature of a physical environment. In some examples, the capture component 510 may capture one or more camera frames including the road feature of the physical environment based on a loss comparison value satisfying a threshold. In some examples, the capture component 510 may transmit the one or more camera frames to verify an annotating using the one or more camera frames.

The classification component 515 may determine a first classification of the road feature based on positioning information of the road feature from a high-definition map and positioning information of the device from a positioning engine. In some examples, the classification component 515 may determine a first pose of the road feature with respect to the device based on the positioning information of the road feature from the high-definition map and the positioning information of the device from the positioning engine. In some examples, the classification component 515 may determine the second classification of the road feature based on the learning model, where determining the second classification of the road feature includes determining a second pose of the road feature with respect to the device based on the learning model. In some examples, comparing the first classification of the road feature to the second classification of the road feature determined by the learning model includes comparing the first pose of the road feature to the second pose of the road feature determined by the learning model, and determining the loss comparison value may be further based on a difference between the first pose of the road feature and the second pose of the road feature satisfying a threshold.

In some examples, the classification component 515 may determine one or more of a first geometric shape of the road feature, a first dimension of the road feature, or a first visual attribute of the road feature based on the positioning information of the road feature from the high-definition map and the positioning information of the device from the positioning engine. In some cases, the first classification of the road feature includes one or more of a first geometric shape of the road feature with respect to the device, a first dimension of the road feature with respect to the device, or a first visual attribute of the road feature with respect to the device. In some cases, the second classification of the road feature includes one or more of a second geometric shape of the road feature with respect to the device, a second dimension of the road feature with respect to the device, or a second visual attribute of the road feature with respect to the device.

The localization component 520 may determine a first localization of the road feature in the camera frame based on the positioning information of the road feature from the high-definition map and the positioning information of the device from the positioning engine. In some examples, the localization component 520 may determine a first multidimensional bounding box for the road feature in the camera frame based on a set of parameters of the device, where the set of parameters includes one or more of a set of intrinsic parameter values or a set of extrinsic parameter values. In some examples, the localization component 520 may determine a second multidimensional bounding box for the road feature in the camera frame based on the learning model. In some examples, comparing the first localization of the road feature in the camera frame to the second localization of the road feature in the camera frame determined by the learning model may include comparing the first multidimensional bounding box to the second multidimensional bounding box determined by the learning model, where determining the loss comparison value may be further based on a difference between the first multidimensional bounding box and the second multidimensional bounding box satisfying a threshold. In some cases, the set of intrinsic parameter values includes one or more of a focal length associated with the device, a principal point associated with the device, a skew coefficient associated with the device, or a distortion associated with the device. In some cases, the set of extrinsic parameter values includes one or more of a rotation associated with a reference frame for the device or a translation associated with the reference frame for the device.

The model component 525 may analyze a learning model by comparing one or more of the first classification of the road feature or the first localization of the road feature in the camera frame to one or more of a second classification of the road feature determined by the learning model or a second localization of the road feature in the camera frame determined by the learning model. In some examples, the model component 525 may determine the loss comparison value based on the comparing. In some examples, the model component 525 may adapt the learning model based on the loss comparison value. In some examples, the model component 525 may compare one or more pixel values associated with one or more coordinates of the first multidimensional bounding box to one or more pixel values associated with one or more coordinates of the second multidimensional bounding box. In some examples, determining the loss comparison value may be further based on a difference between the one or more pixel values of the first multidimensional bounding box and the one or more pixel values of the second multidimensional bounding box. In some examples, the model component 525 may receive loss comparison value feedback, where adapting the learning model based on the loss comparison value feedback.

The calibration component 530 may trigger on-demand calibration of the device based on the loss comparison value satisfying a threshold. In some examples, the calibration component 530 may calibrate, based on the triggering, the device using the set of parameters, where determining the first multidimensional bounding box for the road feature in the camera frame is further based on the calibrating. The annotation component 535 may annotate the camera frame with road feature information based on adapting the learning model. The confidence component 540 may determine a confidence value of the learning model based on the loss comparison value, where adapting the learning model is further based on the confidence value.

Figure 6:
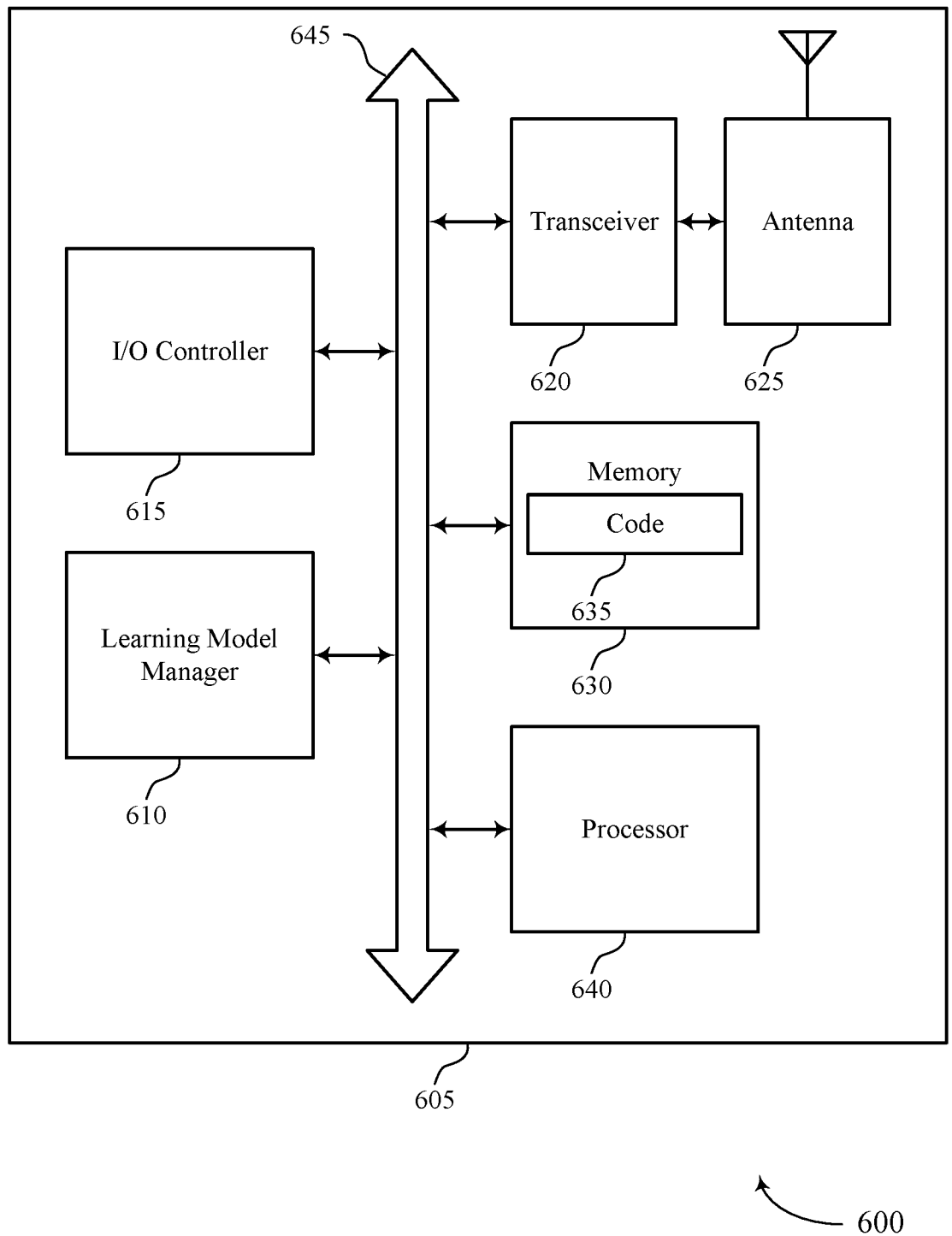
FIG. 6 shows a diagram of a system including a device that supports training and verification of learning models using high-definition map information and positioning information in accordance with aspects of the present disclosure.

FIG. 6 shows a diagram of a system 600 including a device 605 that supports training and verification of learning models using high-definition map information and positioning information in accordance with aspects of the present disclosure. The device 605 may be an example of or include the components of device 305, device 405, or a device as described herein. The device 605 may include components for bi-directional voice and data communications including components for transmitting and receiving communications, including a learning model manager 610, an I/O controller 615, a transceiver 620, an antenna 625, memory 630, and a processor 640. These components may be in electronic communication via one or more buses (e.g., bus 645).

The learning model manager 610 may capture a camera frame including a road feature of a physical environment, determine a first classification of the road feature based on positioning information of the road feature from a high-definition map and positioning information of the device from a positioning engine, determine a first localization of the road feature in the camera frame based on the positioning information of the road feature from the high-definition map and the positioning information of the device from the positioning engine, analyze a learning model by comparing one or more of the first classification of the road feature or the first localization of the road feature in the camera frame to one or more of a second classification of the road feature determined by the learning model or a second localization of the road feature in the camera frame determined by the learning model, determine a loss comparison value based on the comparing, and adapt the learning model based on the loss comparison value.

The I/O controller 615 may manage input and output signals for the device 605. The I/O controller 615 may also manage peripherals not integrated into the device 605. In some cases, the I/O controller 615 may represent a physical connection or port to an external peripheral. In some cases, the I/O controller 615 may utilize an operating system such as iOS, ANDROID, MS-DOS, MS-WINDOWS, OS/2, UNIX, LINUX, or another known operating system. In other cases, the I/O controller 615 may represent or interact with a modem, a keyboard, a mouse, a touchscreen, or a similar device. In some cases, the I/O controller 615 may be implemented as part of a processor. In some cases, a user may interact with the device 605 via the I/O controller 615 or via hardware components controlled by the I/O controller 615.

The transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas. In some cases, the device 605 may include a single antenna 625. However, in some cases the device 605 may have more than one antenna 625, which may be capable of concurrently transmitting or receiving multiple wireless transmissions.

The memory 630 may include RAM and ROM. The memory 630 may store computer-readable, computer-executable code 635 including instructions that, when executed, cause the processor to perform various functions described herein. In some cases, the memory 630 may contain, among other things, a BIOS which may control basic hardware or software operation such as the interaction with peripheral components or devices.

The code 635 may include instructions to implement aspects of the present disclosure, including instructions to support training and verification of learning models. The code 635 may be stored in a non-transitory computer-readable medium such as system memory or other type of memory. In some cases, the code 635 may not be directly executable by the processor 640 but may cause a computer (e.g., when compiled and executed) to perform functions described herein.

The processor 640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In other cases, a memory controller may be integrated into the processor 640. The processor 640 may be configured to execute computer-readable instructions stored in a memory (e.g., the memory 630) to cause the device 605 to perform various functions (e.g., functions or tasks supporting training and verification of learning models using high-definition map information and positioning information).

As detailed above, the learning model manager 610 and/or one or more components of the learning model manager 610 may perform and/or be a means for performing, either alone or in combination with other elements, one or more operations for training and verification of learning models using high-definition map information and positioning information.

Figure 7:
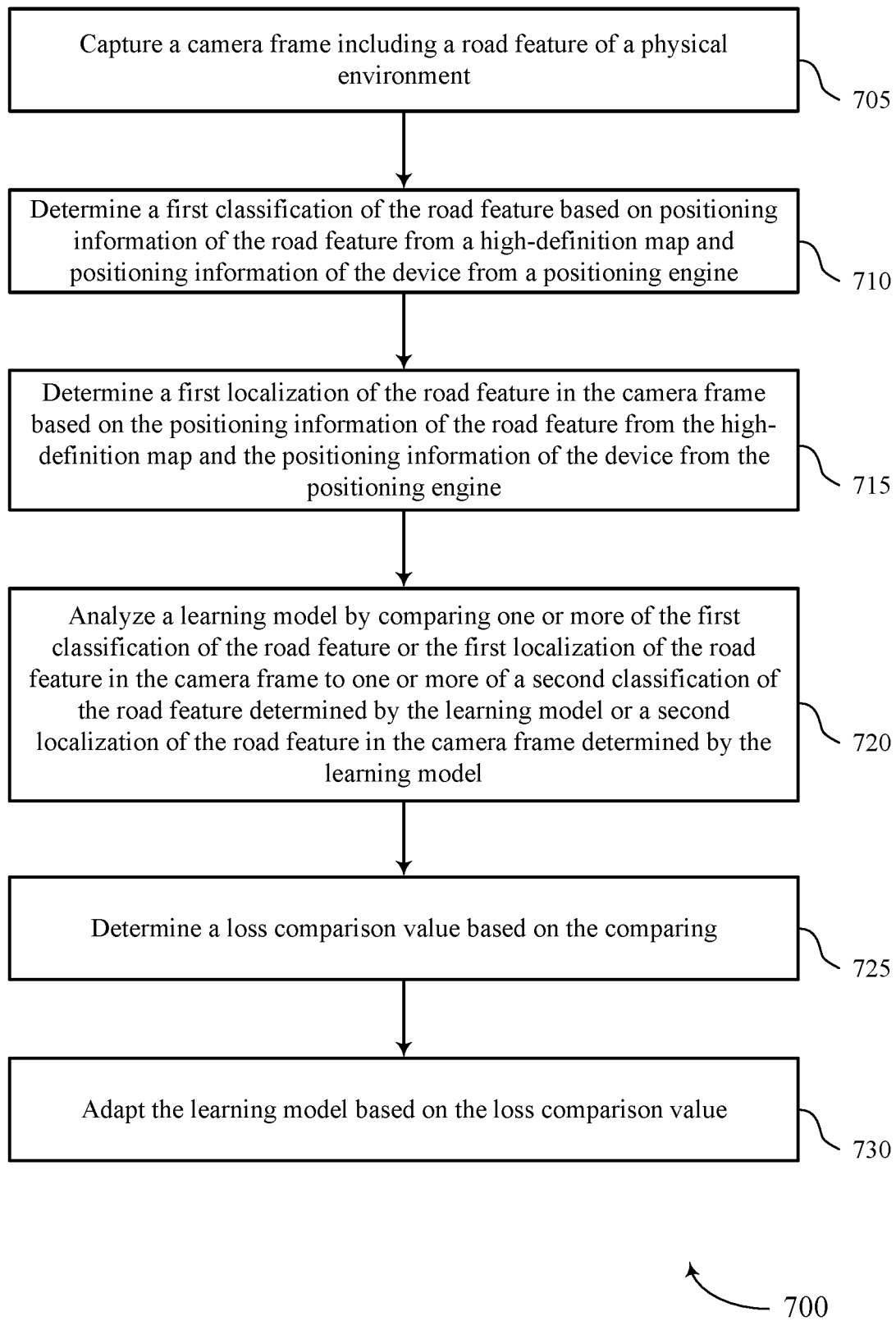
FIGS. 7 through 9 show flowcharts illustrating methods that support training and verification of learning models using high-definition map information and positioning information in accordance with aspects of the present disclosure.

FIG. 7 shows a flowchart illustrating a method 700 that supports training and verification of learning models using high-definition map information and positioning information in accordance with aspects of the present disclosure. The operations of method 700 may be implemented by a device or its components as described herein. For example, the operations of method 700 may be performed by a learning model manager as described with reference to FIGS. 3 through 6. In some examples, a device may execute a set of instructions to control the functional elements of the device to perform the functions described below. Additionally or alternatively, a device may perform aspects of the functions described below using special-purpose hardware.

At 705, the device may capture a camera frame including a road feature of a physical environment. The operations of 705 may be performed according to the methods described herein. In some examples, aspects of the operations of 705 may be performed by a capture component as described with reference to FIGS. 3 through 6.

At 710, the device may determine a first classification of the road feature based on positioning information of the road feature from a high-definition map and positioning information of the device from a positioning engine. The operations of 710 may be performed according to the methods described herein. In some examples, aspects of the operations of 710 may be performed by a classification component as described with reference to FIGS. 3 through 6.

At 715, the device may determine a first localization of the road feature in the camera frame based on the positioning information of the road feature from the high-definition map and the positioning information of the device from the positioning engine. The operations of 715 may be performed according to the methods described herein. In some examples, aspects of the operations of 715 may be performed by a localization component as described with reference to FIGS. 3 through 6.

At 720, the device may analyze a learning model by comparing one or more of the first classification of the road feature or the first localization of the road feature in the camera frame to one or more of a second classification of the road feature determined by the learning model or a second localization of the road feature in the camera frame determined by the learning model. The operations of 720 may be performed according to the methods described herein. In some examples, aspects of the operations of 720 may be performed by a model component as described with reference to FIGS. 3 through 6.

At 725, the device may determine a loss comparison value based on the comparing. The operations of 725 may be performed according to the methods described herein. In some examples, aspects of the operations of 725 may be performed by a model component as described with reference to FIGS. 3 through 6.

At 730, the device may adapt the learning model based on the loss comparison value. The operations of 730 may be performed according to the methods described herein. In some examples, aspects of the operations of 730 may be performed by a model component as described with reference to FIGS. 3 through 6.

Figure 8:
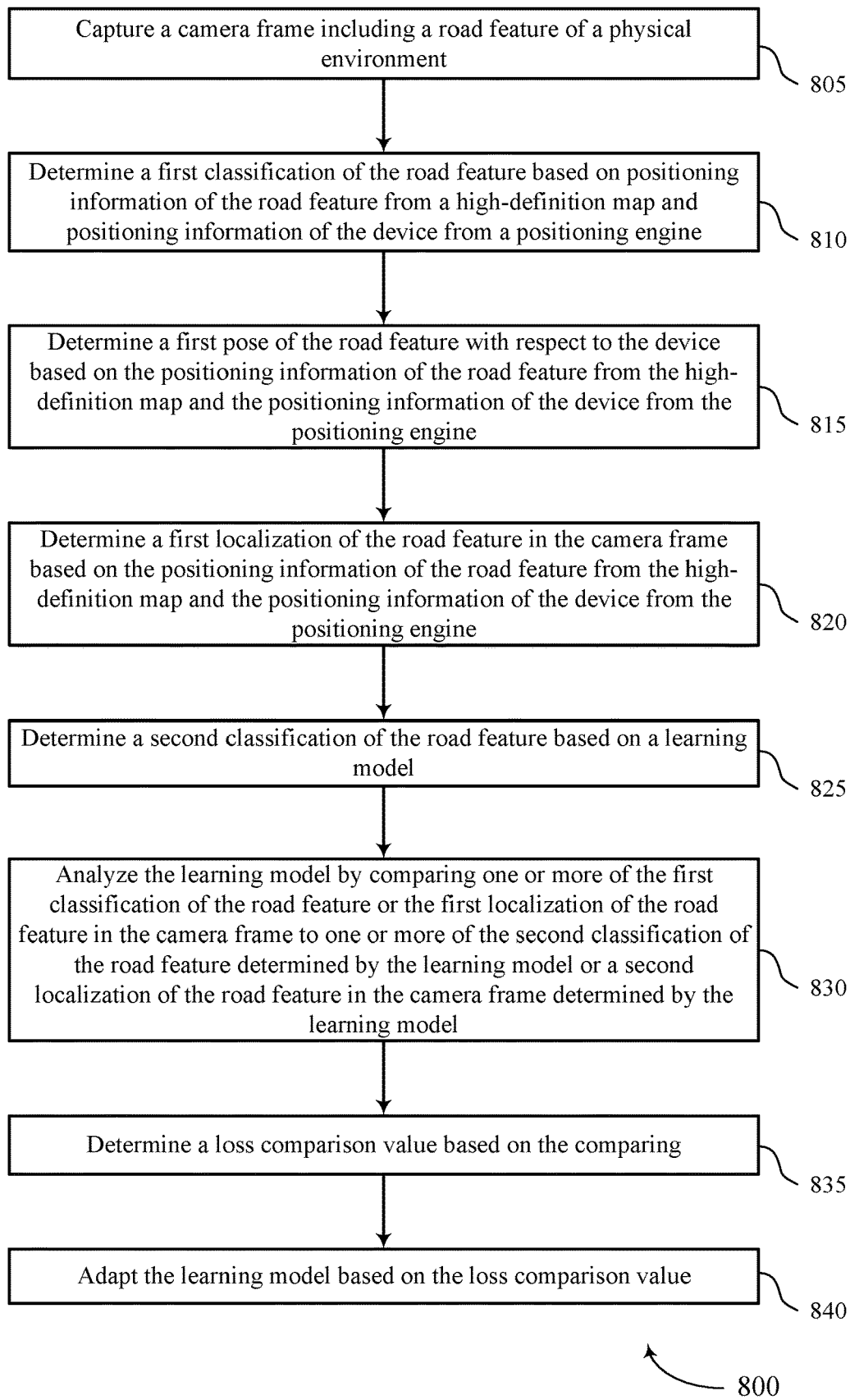

FIG. 8 shows a flowchart illustrating a method 800 that supports training and verification of learning models using high-definition map information and positioning information in accordance with aspects of the present disclosure. The operations of method 800 may be implemented by a device or its components as described herein. For example, the operations of method 800 may be performed by a learning model manager as described with reference to FIGS. 3 through 6. In some examples, a device may execute a set of instructions to control the functional elements of the device to perform the functions described below. Additionally or alternatively, a device may perform aspects of the functions described below using special-purpose hardware.

At 805, the device may capture a camera frame including a road feature of a physical environment. The operations of 805 may be performed according to the methods described herein. In some examples, aspects of the operations of 805 may be performed by a capture component as described with reference to FIGS. 3 through 6.

At 810, the device may determine a first classification of the road feature based on positioning information of the road feature from a high-definition map and positioning information of the device from a positioning engine. The operations of 810 may be performed according to the methods described herein. In some examples, aspects of the operations of 810 may be performed by a classification component as described with reference to FIGS. 3 through 6.

At 815, the device may determine a first pose of the road feature with respect to the device based on the positioning information of the road feature from the high-definition map and the positioning information of the device from the positioning engine. The operations of 815 may be performed according to the methods described herein. In some examples, aspects of the operations of 815 may be performed by a classification component as described with reference to FIGS. 3 through 6.

At 820, the device may determine a first localization of the road feature in the camera frame based on the positioning information of the road feature from the high-definition map and the positioning information of the device from the positioning engine. The operations of 820 may be performed according to the methods described herein. In some examples, aspects of the operations of 820 may be performed by a localization component as described with reference to FIGS. 3 through 6.

At 825, the device may determine a second classification of the road feature based on a learning model. The operations of 825 may be performed according to the methods described herein. In some examples, aspects of the operations of 825 may be performed by a classification component as described with reference to FIGS. 3 through 6.

At 830, the device may analyze the learning model by comparing one or more of the first classification of the road feature or the first localization of the road feature in the camera frame to one or more of the second classification of the road feature determined by the learning model or a second localization of the road feature in the camera frame determined by the learning model. The operations of 830 may be performed according to the methods described herein. In some examples, aspects of the operations of 830 may be performed by a model component as described with reference to FIGS. 3 through 6.

At 835, the device may determine a loss comparison value based on the comparing. The operations of 835 may be performed according to the methods described herein. In some examples, aspects of the operations of 835 may be performed by a model component as described with reference to FIGS. 3 through 6.

At 840, the device may adapt the learning model based on the loss comparison value. The operations of 840 may be performed according to the methods described herein. In some examples, aspects of the operations of 840 may be performed by a model component as described with reference to FIGS. 3 through 6.

Figure 9:
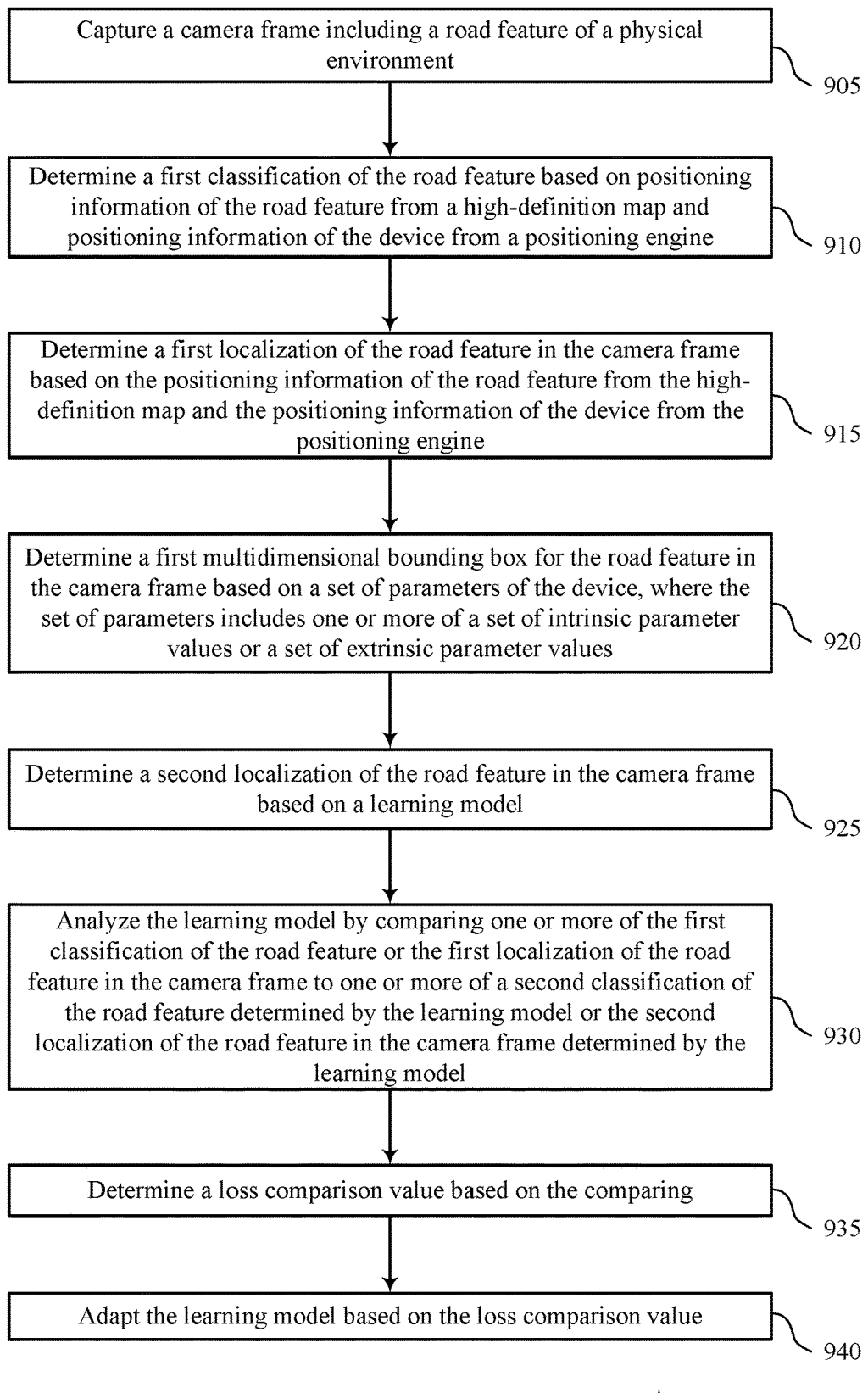

FIG. 9 shows a flowchart illustrating a method 900 that supports training and verification of learning models using high-definition map information and positioning information in accordance with aspects of the present disclosure. The operations of method 900 may be implemented by a device or its components as described herein. For example, the operations of method 900 may be performed by a learning model manager as described with reference to FIGS. 3 through 6. In some examples, a device may execute a set of instructions to control the functional elements of the device to perform the functions described below. Additionally or alternatively, a device may perform aspects of the functions described below using special-purpose hardware.

At 905, the device may capture a camera frame including a road feature of a physical environment. The operations of 905 may be performed according to the methods described herein. In some examples, aspects of the operations of 905 may be performed by a capture component as described with reference to FIGS. 3 through 6.

At 910, the device may determine a first classification of the road feature based on positioning information of the road feature from a high-definition map and positioning information of the device from a positioning engine. The operations of 910 may be performed according to the methods described herein. In some examples, aspects of the operations of 910 may be performed by a classification component as described with reference to FIGS. 3 through 6.

At 915, the device may determine a first localization of the road feature in the camera frame based on the positioning information of the road feature from the high-definition map and the positioning information of the device from the positioning engine. The operations of 915 may be performed according to the methods described herein. In some examples, aspects of the operations of 915 may be performed by a localization component as described with reference to FIGS. 3 through 6.

At 920, the device may determine a first multidimensional bounding box for the road feature in the camera frame based on a set of parameters of the device, where the set of parameters includes one or more of a set of intrinsic parameter values or a set of extrinsic parameter values. The operations of 920 may be performed according to the methods described herein. In some examples, aspects of the operations of 920 may be performed by a localization component as described with reference to FIGS. 3 through 6.

At 925, the device may determine a second localization of the road feature in the camera frame based on a learning model. The operations of 925 may be performed according to the methods described herein. In some examples, aspects of the operations of 925 may be performed by a localization component as described with reference to FIGS. 3 through 6.

At 930, the device may analyze the learning model by comparing one or more of the first classification of the road feature or the first localization of the road feature in the camera frame to one or more of a second classification of the road feature determined by the learning model or the second localization of the road feature in the camera frame determined by the learning model. The operations of 930 may be performed according to the methods described herein. In some examples, aspects of the operations of 930 may be performed by a model component as described with reference to FIGS. 3 through 6.

At 935, the device may determine a loss comparison value based on the comparing. The operations of 935 may be performed according to the methods described herein. In some examples, aspects of the operations of 935 may be performed by a model component as described with reference to FIGS. 3 through 6.

At 940, the device may adapt the learning model based on the loss comparison value. The operations of 940 may be performed according to the methods described herein. In some examples, aspects of the operations of 940 may be performed by a model component as described with reference to FIGS. 3 through 6.

It should be noted that the methods described herein describe possible implementations, and that the operations and the steps may be rearranged or otherwise modified and that other implementations are possible. Further, aspects from two or more of the methods may be combined.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method at a device, comprising:
   capturing a camera frame comprising a road feature of a physical environment;
   determining a first classification of the road feature based at least in part on an autonomous protocol stack of the device combining positioning information of the road feature from a high-definition map and positioning information of the device from a positioning engine;
   determining a first localization of the road feature in the camera frame based at least in part on the autonomous protocol stack of the device combining the positioning information of the road feature from the high-definition map and the positioning information of the device from the positioning engine, wherein determining the first localization of the road feature in the camera frame comprises determining a first multidimensional bounding box for the road feature in the camera frame based at least in part on the positioning information of the road feature from the high-definition map and the positioning information of the device from the positioning engine;
   analyzing a learning model by comparing the first classification of the road feature determined based at least in part on the positioning information of the road feature from the high-definition map and the positioning information of the device from the positioning engine to a second classification of the road feature determined by the learning model and by comparing the first localization of the road feature in the camera frame determined based at least in part on the positioning information of the road feature from the high-definition map and the positioning information of the device from the positioning engine to a second localization of the road feature in the camera frame determined by the learning model;
   determining a loss comparison value based at least in part on the comparing; and
   adapting the learning model based at least in part on determining the loss comparison value and modifying the autonomous protocol stack of the device to verify the second classification of the road feature determined by the learning model and the second localization of the road feature in the camera frame determined by the learning model.

2. The method of claim 1, wherein determining the first classification of the road feature further comprises:
   determining a first pose of the road feature with respect to the device based at least in part on the positioning information of the road feature from the high-definition map and the positioning information of the device from the positioning engine.

3. The method of claim 2, further comprising:
   determining the second classification of the road feature based at least in part on the learning model, wherein determining the second classification of the road feature comprises:
      determining a second pose of the road feature with respect to the device based at least in part on the learning model, wherein comparing the first classification of the road feature to the second classification of the road feature determined by the learning model comprises:
         comparing the first pose of the road feature to the second pose of the road feature determined by the learning model, wherein determining the loss comparison value is further based at least in part on a difference between the first pose of the road feature and the second pose of the road feature satisfying a threshold.

4. The method of claim 1, wherein determining the first localization of the road feature in the camera frame comprises:
   determining the first multidimensional bounding box for the road feature in the camera frame further based at least in part on a set of parameters of the device, wherein the set of parameters comprises one or more of a set of intrinsic parameter values or a set of extrinsic parameter values, wherein determining the first multidimensional bounding box for the road feature in the camera frame is based at least in part on the positioning information of the road feature from the high-definition map, the positioning information of the device from the positioning engine, and the set of parameters of the device.

5. The method of claim 1, further comprising:
determining the second localization of the road feature in the camera frame based at least in part on the learning model, wherein determining the second localization of the road feature comprises:
determining a second multidimensional bounding box for the road feature in the camera frame based at least in part on the learning model, wherein comparing the first localization of the road feature in the camera frame to the second localization of the road feature in the camera frame determined by the learning model comprises:
comparing the first multidimensional bounding box to the second multidimensional bounding box determined by the learning model, wherein determining the loss comparison value is further based at least in part on a difference between the first multidimensional bounding box and the second multidimensional box satisfying a threshold.

6. The method of claim 5, wherein comparing the first multidimensional bounding box to the second multidimensional bounding box further comprises:
comparing one or more pixel values associated with one or more coordinates of the first multidimensional bounding box to one or more pixel values associated with one or more coordinates of the second multidimensional bounding box,
wherein determining the loss comparison value is further based at least in part on a difference between the one or more pixel values of the first multidimensional bounding box and the one or more pixel values of the second multidimensional bounding box.

7. The method of claim 4, wherein:
the set of intrinsic parameter values comprises one or more of a focal length associated with the device, a principal point associated with the device, a skew coefficient associated with the device, or a distortion associated with the device; and
the set of extrinsic parameter values comprises one or more of a rotation associated with a reference frame for the device or a translation associated with the reference frame for the device.

8. The method of claim 4, further comprising:
triggering on-demand calibration of the device based at least in part on the loss comparison value satisfying a threshold; and
calibrating, based at least in part on the triggering, the device using the set of parameters, wherein determining the first multidimensional bounding box for the road feature in the camera frame is further based at least in part on the calibrating.

9. The method of claim 1, further comprising:
annotating the camera frame with road feature information based at least in part on adapting the learning model.

10. The method of claim 9, further comprising:
capturing one or more camera frames comprising the road feature of the physical environment based at least in part on the loss comparison value satisfying a threshold; and
transmitting the one or more camera frames to verify the annotating using the one or more camera frames.

11. The method of claim 1, further comprising:
determining a confidence value of the learning model based at least in part on the loss comparison value, wherein adapting the learning model is further based at least in part on the confidence value.

12. The method of claim 1, further comprising:
receiving loss comparison value feedback, wherein adapting the learning model based at least in part on the loss comparison value feedback.

13. The method of claim 1, wherein:
the first classification of the road feature comprises one or more of a first geometric shape of the road feature with respect to the device, a first dimension of the road feature with respect to the device, or a first visual attribute of the road feature with respect to the device; and
the second classification of the road feature comprises one or more of a second geometric shape of the road feature with respect to the device, a second dimension of the road feature with respect to the device, or a second visual attribute of the road feature with respect to the device.

14. The method of claim 1, wherein determining the first classification of the road feature further comprises:
determining one or more of a first geometric shape of the road feature, a first dimension of the road feature, or a first visual attribute of the road feature based at least in part on the positioning information of the road feature from the high-definition map and the positioning information of the device from the positioning engine.

15. The method of claim 14, further comprising:
determining the second classification of the road feature based at least in part on the learning model, wherein determining the second classification of the road feature comprises:
determining one or more of a second geometric shape of the road feature, a second dimension of the road feature, or a second visual attribute of the road feature based at least in part on the learning model, wherein comparing the first classification of the road feature to the second classification of the road feature determined by the learning model comprises:
comparing one or more of the first geometric shape of the road feature, the first dimension of the road feature, or the first visual attribute of the road feature to one or more of the second geometric shape of the road feature determined by the learning model, the second dimension of the road feature determined by the learning model, or the second visual attribute of the road feature determined by the learning model,
wherein determining the loss comparison value is further based at least in part on a difference between one or more of the first geometric shape of the road feature, the first dimension of the road feature, or the first visual attribute of the road feature and one or more of the second geometric shape of the road feature, the second dimension of the road feature, or the second visual attribute of the road feature satisfying a threshold.

16. An apparatus, comprising:
a processor,
memory in electronic communication with the processor; and
instructions stored in the memory and executable by the processor to cause the apparatus to:
capture a camera frame comprising a road feature of a physical environment;
determine a first classification of the road feature based at least in part on an autonomous protocol stack of the apparatus combining positioning information of the road feature from a high-definition map and positioning information of the apparatus from a positioning engine;

determine a first localization of the road feature in the camera frame based at least in part on the autonomous protocol stack of the apparatus combining the positioning information of the road feature from the high-definition map and the positioning information of the apparatus from the positioning engine, wherein determining the first localization of the road feature in the camera frame comprises determining a first multidimensional bounding box for the road feature in the camera frame based at least in part on the positioning information of the road feature from the high-definition map and the positioning information of the apparatus from the positioning engine;

analyze a learning model by comparing the first classification of the road feature determined based at least in part on the positioning information of the road feature from the high-definition map and the positioning information of the apparatus from the positioning engine to a second classification of the road feature determined by the learning model and by comparing the first localization of the road feature in the camera frame determined based at least in part on the positioning information of the road feature from the high-definition map and the positioning information of the apparatus from the positioning engine to a second localization of the road feature in the camera frame determined by the learning model;

determine a loss comparison value based at least in part on the comparing; and adapt the learning model based at least in part on determining the loss comparison value and modifying the autonomous protocol stack of the apparatus to verify the second classification of the road feature determined by the learning model and the second localization of the road feature in the camera frame determined by the learning model.

17. The apparatus of claim 16, wherein the instructions to determine the first classification of the road feature further are executable by the processor to cause the apparatus to:

determine a first pose of the road feature with respect to the apparatus based at least in part on the positioning information of the road feature from the high-definition map and the positioning information of the apparatus from the positioning engine.

18. The apparatus of claim 17, wherein the instructions are further executable by the processor to cause the apparatus to:

determine the second classification of the road feature based at least in part on the learning model, wherein the instructions to determine the second classification of the road feature further are executable by the processor to cause the apparatus to:

determine a second pose of the road feature with respect to the apparatus based at least in part on the learning model, wherein the instructions to compare the first classification of the road feature to the second classification of the road feature further are executable by the processor to cause the apparatus to:

compare the first pose of the road feature to the second pose of the road feature determined by the learning model, wherein the instructions to determine the loss comparison value are further based at least in part on a difference between the first pose of the road feature and the second pose of the road feature satisfying a threshold.

19. The apparatus of claim 16, wherein the instructions to determine the first localization of the road feature in the camera frame further are executable by the processor to cause the apparatus to:

determine the first multidimensional bounding box for the road feature in the camera frame further based at least in part on a set of parameters of the apparatus, wherein the set of parameters comprises one or more of a set of intrinsic parameter values or a set of extrinsic parameter values, wherein the instructions to determine the first multidimensional bounding box for the road feature in the camera frame are further based at least in part on the positioning information of the road feature from the high-definition map, the positioning information of the apparatus from the positioning engine, and the set of parameters of the apparatus.

20. An apparatus, comprising:

means for capturing a camera frame comprising a road feature of a physical environment;

means for determining a first classification of the road feature based at least in part on an autonomous protocol stack of the apparatus combining positioning information of the road feature from a high-definition map and positioning information of the apparatus from a positioning engine;

means for determining a first localization of the road feature in the camera frame based at least in part on the autonomous protocol stack of the apparatus combining the positioning information of the road feature from the high-definition map and the positioning information of the apparatus from the positioning engine, wherein determining the first localization of the road feature in the camera frame comprises determining a first multidimensional bounding box for the road feature in the camera frame based at least in part on the positioning information of the road feature from the high-definition map and the positioning information of the apparatus from the positioning engine;

means for analyzing a learning model by comparing the first classification of the road feature determined based at least in part on the positioning information of the road feature from the high-definition map and the positioning information of the apparatus from the positioning engine to a second classification of the road feature determined by the learning model and by comparing the first localization of the road feature in the camera frame determined based at least in part on positioning information of the road feature from the high-definition map and the positioning information of the apparatus from the positioning engine to a second localization of the road feature in the camera frame determined by the learning model;

means for determining a loss comparison value based at least in part on the comparing; and means for adapting the learning model based at least in part on determining the loss comparison value and modifying the autonomous protocol stack of the apparatus to verify the second classification of the road feature determined by the learning model and the second localization of the road feature in the camera frame determined by the learning model.

* * * * *